(12) United States Patent
Chang et al.

(10) Patent No.: US 10,900,815 B2
(45) Date of Patent: Jan. 26, 2021

(54) COLOR WHEEL PHASE DETECTION METHOD AND PROJECTOR USING THE SAME

(71) Applicant: Qisda Corporation, Taoyuan (TW)

(72) Inventors: Wei-Chun Chang, New Taipei (TW); Chun-Kun Yu, Taoyuan (TW); Chien-Wei Sung, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 88 days.

(21) Appl. No.: 16/403,672

(22) Filed: May 6, 2019

(65) Prior Publication Data

US 2019/0368900 A1 Dec. 5, 2019

(30) Foreign Application Priority Data

May 29, 2018 (CN) .......................... 2018 1 0534099

(51) Int. Cl.
| | |
|---|---|
| *G01D 5/245* | (2006.01) |
| *G02B 26/00* | (2006.01) |
| *G03B 21/20* | (2006.01) |
| *G03B 21/14* | (2006.01) |
| *G03B 33/08* | (2006.01) |

(52) U.S. Cl.
CPC ............ *G01D 5/245* (2013.01); *G02B 26/008* (2013.01); *G03B 21/204* (2013.01); *G03B 21/14* (2013.01); *G03B 33/08* (2013.01)

(58) Field of Classification Search
CPC ............ G01D 5/00; G01D 5/12; G01D 5/244; G01D 5/245; G01D 5/26; G01D 5/32; G01D 5/34; G01D 5/347; G01D 5/34776; G01D 5/34792; G02B 26/00; G02B 26/007; G02B 26/008; G03B 21/00; G03B 21/14; G03B 21/20; G03B 21/2006; G03B 21/2033; G03B 21/204; G03B 21/206; G03B 33/00; G03B 33/08
USPC ............ 324/200, 207.11, 207.25, 76.11, 136
See application file for complete search history.

(56) References Cited

U.S. PATENT DOCUMENTS

| | | | | |
|---|---|---|---|---|
| 5,784,038 | A * | 7/1998 | Irwin .................... | H04N 9/3114 345/32 |
| 9,134,593 | B1 * | 9/2015 | Worley, III ............ | G03B 21/26 |
| 10,260,709 | B2 * | 4/2019 | Cui ....................... | G03B 21/204 |
| 2006/0067673 | A1 * | 3/2006 | Tanaka .................. | H04N 9/3114 396/429 |
| 2007/0064161 | A1 * | 3/2007 | Takeda .................. | G02B 26/008 348/743 |

(Continued)

*Primary Examiner* — Hoai-An D. Nguyen

(57) ABSTRACT

A color wheel phase detection method and a projector using the same are provided. Firstly, a projector, including a light source, a color wheel, a motor, an indication signal generator and a controller, is provided, wherein the motor drive having n pairs of magnetic polarities drives the color wheel, including n color block groups of the same kind, to rotate, wherein n is a positive integer ≥1. Then, the color wheel is driven to rotate by the motor. Then, a light is projected on the n color block groups by the light source. Then, a phase signal having 2n zero-crossing points is generated by the motor. Then, an indication signal including n pulses corresponding to n zero-crossing points is generated by the indication signal generator according to the 2n zero-crossing points. Then, the phase of the color wheel is detected by the controller according to the indication signal.

12 Claims, 3 Drawing Sheets

(56) References Cited

U.S. PATENT DOCUMENTS

| | | | |
|---|---|---|---|
| 2008/0174744 A1* | 7/2008 | Myoung | G03B 33/08 353/84 |
| 2018/0249137 A1* | 8/2018 | Kobayashi | H04N 9/312 |

* cited by examiner

COLOR WHEEL PHASE DETECTION METHOD AND PROJECTOR USING THE SAME

This application claims the benefit of People's Republic of China application Serial No. 201810534099.1, filed on May 29, 2018, the subject matter of which is incorporated herein by reference.

BACKGROUND OF THE INVENTION

Field of the Invention

The invention relates in general to a detection method and a projector using the same, and more particularly to a color wheel phase detection method and a projector using the same.

Description of the Related Art

The projector is configured to project an image on an external screen. The projector displays the image at a particular refresh frequency. For example, a refresh frequency of 60 Hz indicates that the image is refreshed every 1/60 second. However, when the refresh frequency changes, the rotation angle of the color wheel may be biased due to the time delay caused by the electronic element of the projector, and the bias in the rotation angle of the color wheel will generate distortion on the display the image. For example, the color may be shifted and the colors of the display image may not be the expected colors. Furthermore, the current sensor for determining the rotation speed of the color wheel when affected by ambient interference will have a deteriorated reliability.

SUMMARY OF THE INVENTION

The invention is directed to a color wheel phase detection method with color scheme of color wheel. The color wheel phase detection method is used in a projector and other optical electromechanical system and is capable of resolving the above problems encountered by the current technology.

According to one embodiment of the present invention, a color wheel phase detection method is provided. The color wheel phase detection method includes the following steps. Firstly, a projector, including a light source, a color wheel, a motor, an indication signal generator and a controller provided, wherein the motor is configured to drive the color wheel to rotate, the motor includes n pairs of magnetic polarities, the color wheel includes n color block groups of the same kind, and n is a positive integer $\geq 1$. Then, the color wheel is driven to rotate by the motor. Then, a light is projected on the n color block groups of the color wheel by the light source. Then, a phase signal having 2n zero-crossing points is generated by the motor. Then, an indication signal including n pulses corresponding to n zero-crossing points of 2n zero-crossing points is generated by the indication signal generator according to the 2n zero-crossing points of the phase signal. Then, the phase of the color wheel is detected by the controller according to the indication signal.

According to another embodiment of the present invention, a projector is provided. The projector includes a light wheel, a light source, a motor, an indication signal generator and a controller. The color wheel includes n color block groups of the same kind, wherein n is a positive integer $\geq 1$. The light source is configured to project a light on the n color block groups. The motor is configured to drive the color wheel to rotate and generate a phase signal, wherein the motor includes n pairs of magnetic polarities and the phase signal has 2n zero-crossing points. The indication signal generator is configured to generate an indication signal according to the 2n zero-crossing points of the phase signal, wherein the indication signal includes n pulses corresponding to n zero-crossing points of 2n zero-crossing points. The controller detects the phase of the color wheel according to the indication signal.

The above and other aspects of the invention will become better understood with regard to the following detailed description of the preferred but non-limiting embodiment(s). The following description is made with reference to the accompanying drawings.

DETAILED DESCRIPTION OF THE INVENTION

Principles of the structure and operation of the present invention are disclosed below with accompanying drawings.

Figure 1A:
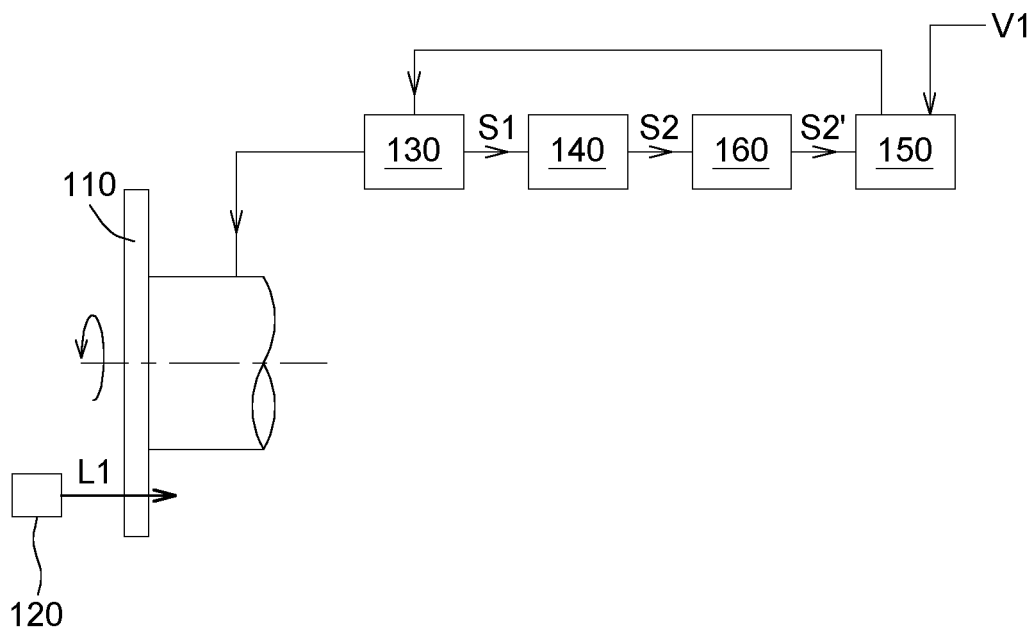
FIG. 1A is a functional block diagram of a projector according to an embodiment of the present invention.
Figure 1B:
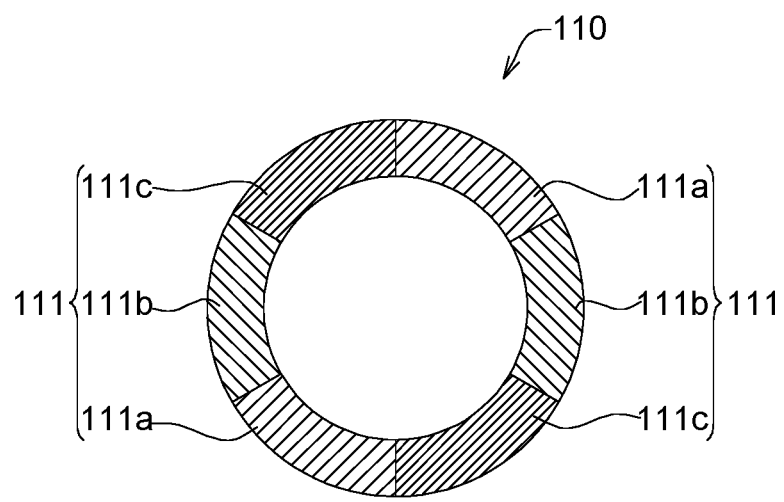
FIG. 1B is a side view of the color wheel of FIG. 1A.
Figure 2:
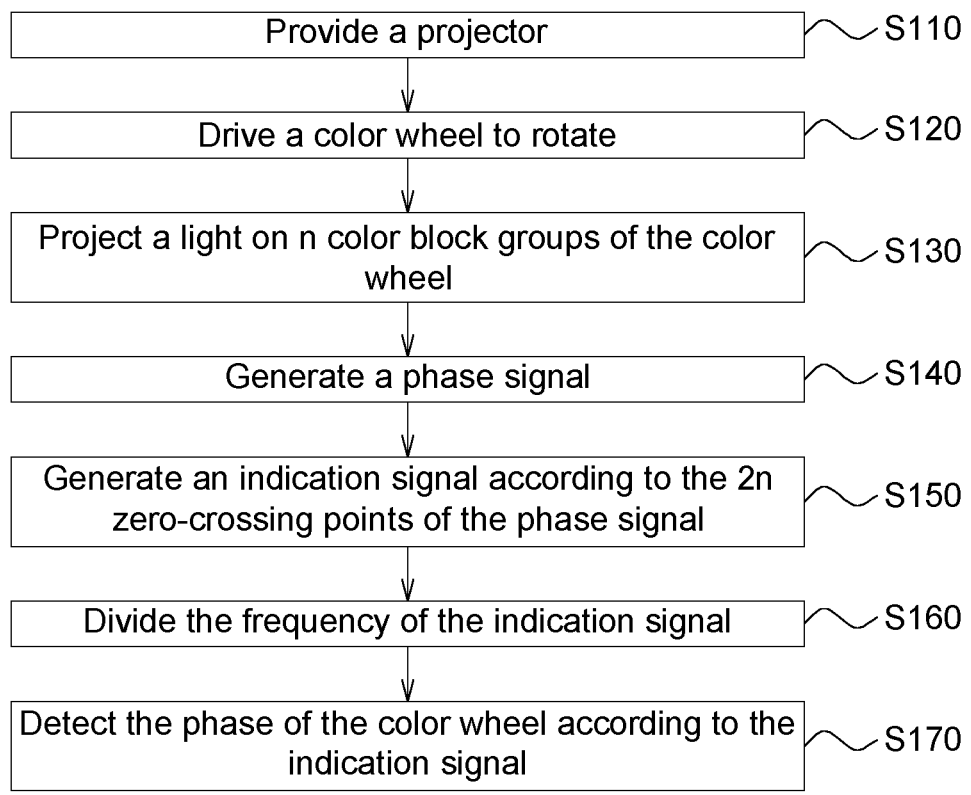
FIG. 2 is a flowchart of a color wheel phase detection method according to an embodiment of the present invention.
Figure 3:
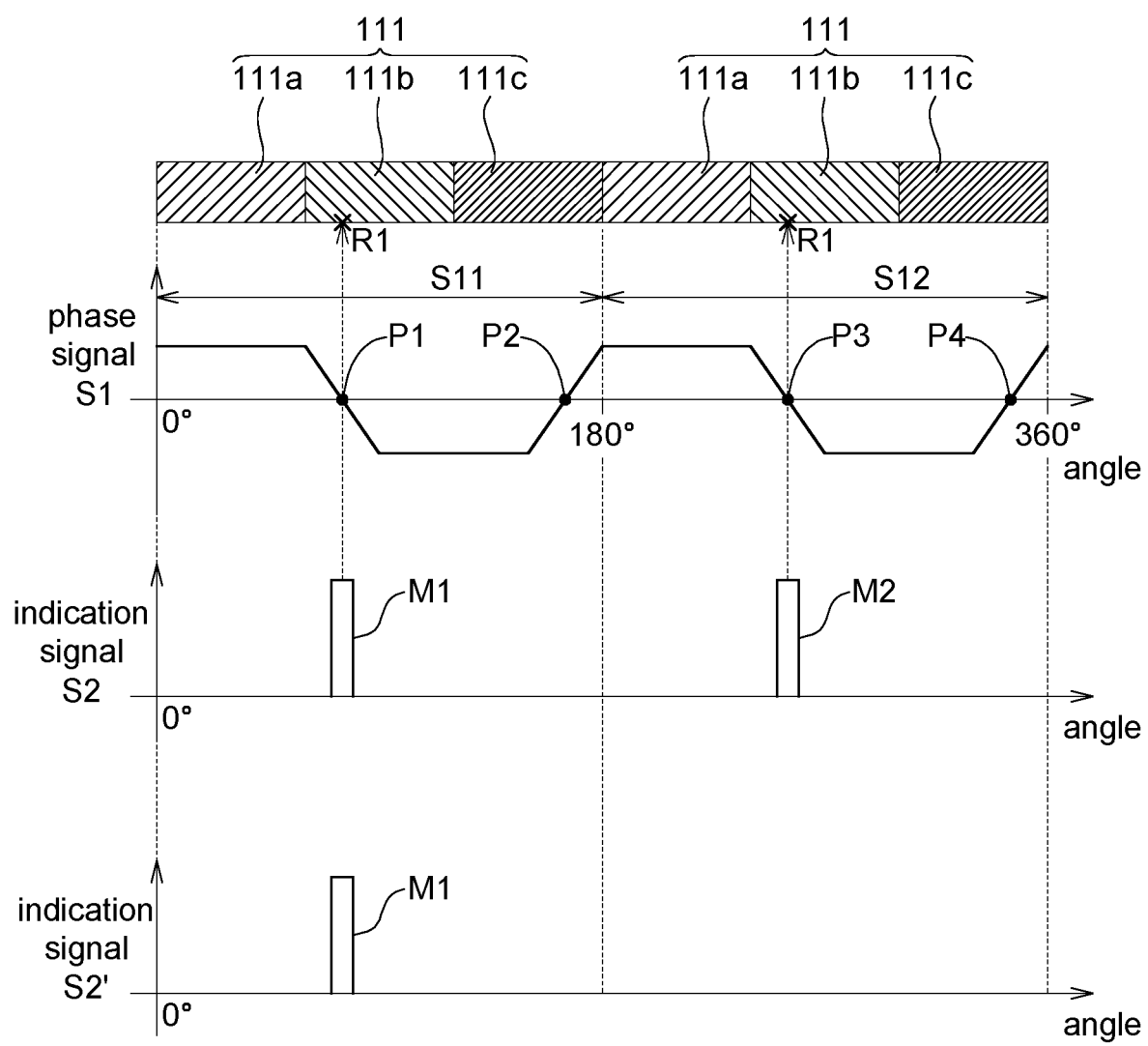
FIG. 3 is a relationship diagram of color block groups of the color wheel of FIG. 1A vs phase signal and indication signals.

Refer to FIGS. 1A, 1B, 2 and 3. FIG. 1A is a functional block diagram of a projector 100 according to an embodiment of the present invention. FIG. 1B is a side view of the color wheel of FIG. 1A. FIG. 2 is a flowchart of a color wheel phase detection method according to an embodiment of the present invention. FIG. 3 is a relationship diagram of color block groups 111 of the color wheel 110 of FIG. 1A vs phase signal S1 and indication signals S2 and S2'. The relationship diagram FIG. 3 is exemplified by 1 cycle (that is, the color wheel 130 rotates for 360°). As the color wheel 110 rotates, multiple cycles can be generated. The processing method in each cycle is similar or identical to that disclosed below.

In step S110, as indicated in FIGS. 1A and 1B, a projector 100 is provided, wherein the projector 100 includes a light source 120, a color wheel 110, a motor 130, an indication signal generator 140, a controller 150 and a modulator 160. The color wheel 110 includes n color block groups 111 of the same kind, wherein n is a positive integer $\geq 1$. In the present embodiment, the color scheme and arrangement order in each of the n color block groups 111 are the same, and the color mode can be any color modes, such as the RGB primary color mode, the CMYK mode, or the Lab mode. The color wheel in this invention can be general color wheel as described above or can be, for example, a fluorescent powder wheel or other kinds of wavelength conversion wheels.

As indicated in FIG. 1B, each of the n color block groups 111 has the same size and the color wheel 110 is composed of the n color block groups only. Let n be exemplified by 2. The 2 color block groups 111 are continuously extended to form a 360° circle on the color wheel 110, and each color block group 111 has an extension angle of 180° (that is, 360°/n). As indicated in FIG. 1B, each of the n color block groups 111 includes m primary color blocks, wherein m is a positive integer ≥1. In the example of the RGB primary color mode, m is equal to 3, and the 3 primary color blocks respectively are a first primary color block 111a, a second primary color block 111b and a third primary color block 111c, wherein the first primary color block 111a is one of the red (R) color block, the green (G) color block and the blue (B) color block; the second primary color block 111b is the other one of the red color block, the green color block and the blue color block; the third primary color block 111c is the remaining one of the red color block, the green color block and the blue color block. Besides, the arrangement order of the m primary color blocks in each of the n color block groups is the same. In the example of the RGB primary color mode, the 3 primary color blocks are arranged in each of the n color block groups 111 along the same direction (such as clockwise) according to the order of the first primary color block 111a, the second primary color block 111b and the third primary color block 111c. However, the arrangement order in the embodiments of the present invention is not limited to the above exemplification.

In step S120, as indicated in FIG. 1A, the color wheel 110 is driven to rotate by the motor 130 under the control of the controller 150 according to a reference signal V1, which can be an image synchronization (V-sync) or a sequence start signal generated inside the controller 150.

In step S130, as indicated in FIG. 1A, a light L1 is projected on the n color block groups of the color wheel 110 by the light source 120, wherein the light L1 projects an image to the outside of the projector 100 through an optical element (not illustrated) on the optical path (not illustrated).

In step S140, as indicated in FIGS. 1A and 3, a phase signal S1 is generated by the motor 130. When the motor 130 is a 3-phase motor, the motor 130 can generate 3 different phase signals S1. Any one of the 3 phase signals S1 can be adopted in the embodiments of the present invention. In the present embodiment, since the motor 130 includes n pairs of magnetic polarities, the phase signal S1 has 2n (that is, 2×n) zero-crossing points. The generation method of the phase signal S1 is as follows. Firstly, a back electromotive force (back EMF) of a motor 130 is detected by a motor driver (not illustrated) of the motor 130. Then, the positions of the magnetic polarities of the motor 130 are detected according to the back electromotive force. Then, a phase signal S1 is generated.

As indicated in FIG. 3, where n is exemplified by 2, the phase signal S1 has 4 (that is, 2×n) zero-crossing points, namely, zero-crossing points P1, P3, P3 and P4. The 2n zero-crossing points include rising zero-crossing points and falling zero-crossing points. For example, the zero-crossing points P1 and P3 are falling zero-crossing points, and the zero-crossing points P2 and P4 are rising zero-crossing points. In the present specification, "falling zero-crossing points" refer to the points at which voltage changes to 0 from a positive voltage; "rising zero-crossing points" refer to the points at which voltage changes to 0 from a negative voltage.

As indicated in FIG. 3, since the number of pairs of magnetic polarities (that is, n) is the same as the number of the color block groups 111 (that is, n), each color block group 111 corresponds to the same commutation timing of the phase signal S1. For example, 2 color block groups 111 respectively correspond to 2 commutation timings S11 and S12, which are exactly the same. Since each color block group 111 is exactly the same, at each commutation timing, the corresponding relationship between the n zero-crossing points and the n color block groups are the same. For example, as indicated in FIG. 3, at the commutation timing S11, the rising zero-crossing point P1 corresponds to the position R1 of the second primary color block 111b of the color block group 111; at the commutation timing S12, the rising zero-crossing point P3 also corresponds to the position R1 of the second primary color block 111b of another color block group 111. As disclosed above, at each commutation timing, the relationship between the zero-crossing point and color block groups 111 is fixed (that is, the correspondence is unique). Thus, the rotation position of the color wheel 110 can be determined according to the position of the zero-crossing point.

In step S150, as indicated in FIGS. 1A and 3, an indication signal S2 is generated by the indication signal generator 140 according to the 2n zero-crossing points of the phase signal S1, wherein the indication signal S2 includes n pulses corresponding to n zero-crossing points of 2n zero-crossing points, and the n zero-crossing points all are rising zero-crossing points or falling zero-crossing points. Let n be exemplified by 2. The 2 (that is, n) pulses M1 and M2 of the indication signal S2 both corresponding to falling zero-crossing points are generated. In another embodiment, the 2 pulses M1 and M2 of the indication signal S2 both corresponding to rising zero-crossing points are generated.

In other embodiments, each phase signal S1 generated by the indication signal generator 140 may include 2n pulses, wherein the 2n pulses correspond to the 2n zero-crossing points of the phase signal S1. Then, the indication signal S2 of FIG. 3 is obtained from n pulses corresponding to rising zero-crossing points or n pulses corresponding to falling zero-crossing points, wherein the n pulses are selected from the 2n pulses of the phase signal S1 by the indication signal generator 140.

In step S160, as indicated in FIGS. 1A and 3, the frequency of the indication signal S2 is divided by the modulator 160 to adjust the number of the n pulses in each cycle as 1. As indicated in FIG. 3, where n is exemplified by 2, the modulator 160 divides the frequency of the 2 (that is, n) pulses M1 and M2 in a cycle (that is, 360°), and only keeps the pulse M1 in a cycle to obtain the indication signal S2' of FIG. 3. In another embodiment, the modulator 160 can only keep the pulse M2 in a cycle.

In step S170, as indicated in FIGS. 1A and 3, the phase detection for the color wheel 110 is performed by the controller 150 according to the indication signal S2'. For example, the actual rotation position and/or the actual rotation speed of the color wheel 130 are calculated by the controller 150 according to the indication signal S2'. Then, the motor 130 is controlled by the controller 150 according to the reference signal V1 to adjust the operation of the color wheel 110 (for example, adjusts the rotation speed) to provide a correct color output.

The phase signal S1 of FIG. 3 has only 1 cycle. However, as the color wheel 110 continues to rotate, the phase signal S1 will generate multiple cycles. In the embodiment of the present invention, the processing method of the signal continuously generated in each cycle is similar or identical to that disclosed in above steps, and the similarities are not repeated here.

It can be understood from the above disclosure that the rotation angle of the color wheel controlled by the controller will inevitably be biased due to the time delay caused by the electronic element of the projector, and the frame projected by a light passing through a biased color wheel will be distorted. Conversely, the projector 100 disclosed in above embodiments of the present invention, despite having the time delay as disclosed above, still can process the phase signal S1 of the motor 130 to obtain the actual operation of the color wheel 110 and more accurately detect the phase of the color wheel 130. Besides, the rotation position and/or the rotation frequency of the color wheel 110 can be determined according to the phase signal S1 of the motor 130, and the phase of the color wheel 130 can be detected without using any additional sensors.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A color wheel phase detection method, comprising:
providing a projector, the projector comprising a light source, a color wheel, a motor, an indication signal generator and a controller, wherein the motor comprises n pairs of magnetic polarities, the color wheel comprises n color block groups of the same kind, and n is a positive integer ≥1;
driving the color wheel to rotate by the motor;
projecting light on the n color block groups of the color wheel by the light source;
generating a phase signal by the motor, wherein the phase signal has 2n zero-crossing points;
generating an indication signal by the indication signal generator according to the 2n zero-crossing points of the phase signal, wherein the indication signal comprises n pulses corresponding to n zero-crossing points of the 2n zero-crossing points; and
performing the phase detection for the color wheel by the controller according to the indication signal.

2. The color wheel phase detection method according to claim 1, characterized in that in the step of generating the indication signal by the indication signal generator according to the 2n zero-crossing points of the phase signal, the n zero-crossing points all are rising zero-crossing points or falling zero-crossing points.

3. The color wheel phase detection method according to claim 1, characterized in that corresponding relationship between the n zero-crossing points and the n color block groups are the same.

4. The color wheel phase detection method according to claim 1, characterized in that the indication signal has a plurality of cycles each having the n pulses; the projector further comprises a modulator; and the color wheel phase detection method further comprises:
dividing frequency of the indication signal by the modulator to adjust the number of the n pulses in each cycle as 1.

5. The color wheel phase detection method according to claim 1, characterized in that each of the n color block groups comprises m primary color blocks, arrangement order of the m primary color blocks in each of the n color block groups is the same, wherein m is a positive integer ≥1.

6. The color wheel phase detection method according to claim 1, characterized in that each of the n color block groups has the same size and the color wheel is composed of the n color block groups only.

7. A projector, comprising:
a color wheel, comprising n color block groups of the same kind, wherein n is a positive integer ≥1;
a light source configured to project a light on the n color block groups;
a motor configured to drive the color wheel to rotate and generate a phase signal, wherein the motor comprises n pairs of magnetic polarities and the phase signal has 2n zero-crossing points; and
an indication signal generator configured to generate an indication signal according to the 2n zero-crossing points of the phase signal, wherein the indication signal comprises n pulses corresponding to n zero-crossing points of the 2n zero-crossing points; and
a controller configured to detect the phase of the color wheel according to the indication signal.

8. The projector according to claim 7, characterized in that the n zero-crossing points all are rising zero-crossing points or falling zero-crossing points.

9. The projector according to claim 7, characterized in that corresponding relationship between the n zero-crossing points and the n color block groups are the same.

10. The projector according to claim 7, characterized in that the indication signal has a plurality of cycle each having the n pulses; the projector further comprises:
a modulator configured to divide the frequency of the indication signal to adjust the number of the n pulses in each cycle as 1.

11. The projector according to claim 7, characterized in that each of the n color block groups comprises m primary color blocks, and arrangement order of the m primary color blocks in each of the n color block groups is the same.

12. The projector according to claim 7, characterized in that each of the n color block groups has the same size and the color wheel is composed of the n color block groups only.

* * * * *